United States Patent [19]

Wyatt

[11] Patent Number: 4,821,893
[45] Date of Patent: Apr. 18, 1989

[54] DISPLAY STAND
[75] Inventor: Roger M. Wyatt, Cape Town, South Africa
[73] Assignee: Truworths Limited, Cape Town, South Africa
[21] Appl. No.: 76,117
[22] Filed: Jul. 21, 1987
[30] Foreign Application Priority Data
   Jul. 21, 1986 [ZA] South Africa .................. 86/5423
[51] Int. Cl.⁴ .................................. A47H 1/00
[52] U.S. Cl. ............................ 211/123; 211/182
[58] Field of Search .............. 211/123, 181, 206, 191, 211/1, 182; 403/49, 190, 191, 235, 237
[56] References Cited
   U.S. PATENT DOCUMENTS
   1,460,928 7/1923 Tilden ........................ 211/182 X
   2,612,273 9/1952 Smith ......................... 211/123 X
   2,848,258 8/1958 Mudd .......................... 403/190
   3,594,025 7/1971 Wagner ........................ 403/237
   3,747,885 7/1973 Ciancimino ................ 403/190 X
   4,176,753 12/1979 Godfrey ....................... 211/182
   4,653,652 3/1987 Avati ........................ 211/182 X Primary Examiner—J. Franklin Foss
Assistant Examiner—Sarah A. Leckok Eley
Attorney, Agent, or Firm—Dressler, Goldsmith, Shore, Sutker & Milnamow, Ltd.

[57] ABSTRACT

To obtain a display stand which can have the arrangement of its rails altered with ease but in which the rails will not readily slip with respect to one another, a joint structure including a plug is provided, the joint structure connecting two rails. The plug has a transverse groove in it for receiving and gripping the rail and pushes into the end of the other rail. The diameter of the rail exceeds the size of the groove provided for it so that the gripping action is enhanced.

5 Claims, 2 Drawing Sheets

DISPLAY STAND

BACKGROUND OF THE INVENTION

In retail outlets, and particularly in clothing stores, display stands are provided on which merchandise is hung.

It is desirable to be able to change the configuration of the stands in dependence on the type of merchandise to be displayed. For example, it may be desirable for the stands to include shelves which are supported on rails. Alternatively the stands can include hanging rails in preference to shelving. While it must be possible to move a rail running in one direction with respect to a rail running transversely to it to enable the configuration of the rack to be varied, accidental slippage of the rails with respect to one another, or accidental lifting of one rail off another, must not be possible.

BRIEF SUMMARY OF THE INVENTION

According to the present invention there is provided a joint structure connecting one rail of a display stand to a further rail of the display stand which is transverse thereto, said one rail being tubular with a plug pushed into its end, the plug being of a resilient material and having a part cylindrical transverse groove in the cylindrical outer face thereof, said further rail being in said groove when said one rail is mounted on said further rail, said plug gripping said further rail to inhibit relative movement between the rails.

To provide an adequate grip between said plug and said further rail, said groove can be bounded by a part-cylindrical surface which is more than semi-cylindrical in extent and by two flat surfaces which form extensions of the part-cylindrical surface, free edges of said flat surfaces bounding the entrance of said groove. Preferably said flat surfaces converge with one another so that said groove is narrower at said entrance than where said part-cylindrical surface and said flat surfaces intersect.

In a specific form said plug has a cylindrical outer surface consisting of two portions of different diameters, there being an annular abutment surface where said two portions meet, said end of said one rail abutting said abutment surface, the larger diameter portion of the plug having said groove in it and being outside said one rail.

In another form of joint structure said one rail has a transverse opening in the wall thereof, said groove and said opening being aligned so that said further rail is entered in both when said one rail is mounted on the further rail.

BRIEF DESCRIPTION OF DRAWINGS

For a better understanding of the present invention, and to show how the same may be carried into effect, reference will now be made, by way of example, to the accompanying drawings in which.

DETAILED DESCRIPTION OF DRAWINGS

Figure 1:
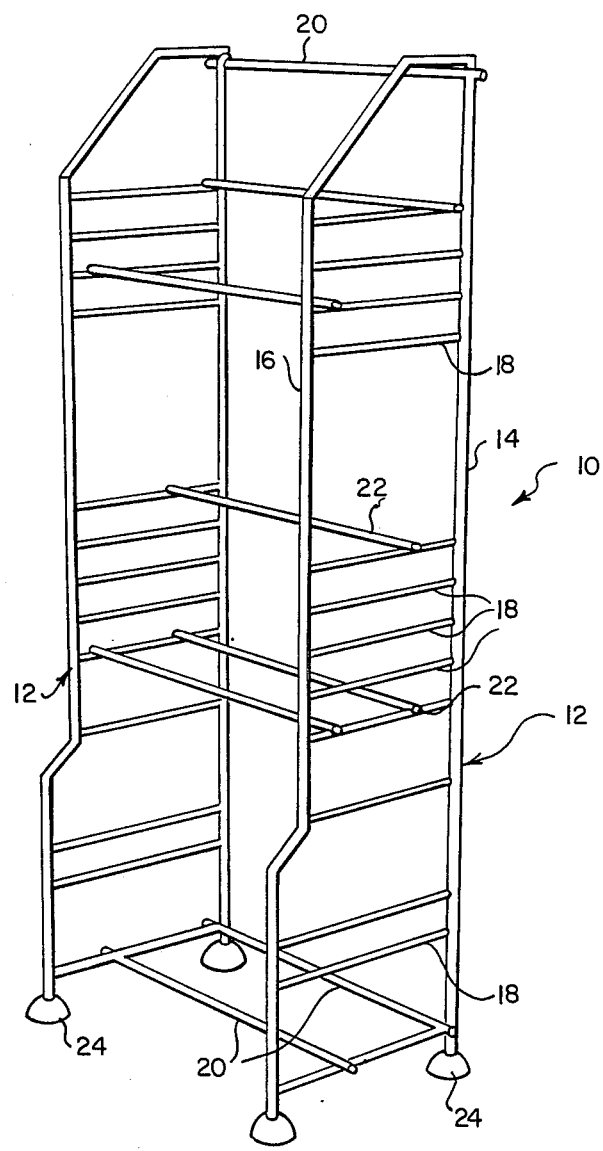
FIG. 1 is a pictorial view of a display stand.

Referring firstly to FIG. 1, the display stand 10 illustrated comprises two vertically elongate end frames 12 each of which includes two uprights 14 and 16 and a plurality of fixed rails 18. The upright 14 is in the form of a straight, vertical member and the upright 16 is cranked at a number of locations to provide the shape illustrated. The end frames 12 are connected together by permanent rails 20.

Movable rails are shown at 22 and the manner in which these are attached to the fixed rails 18 will be described in more detail hereinafter. It will be noted that the display stand 10 includes resilient feet 24 which prevent the uprights 14 and 16 damaging the floor.

Figure 2:
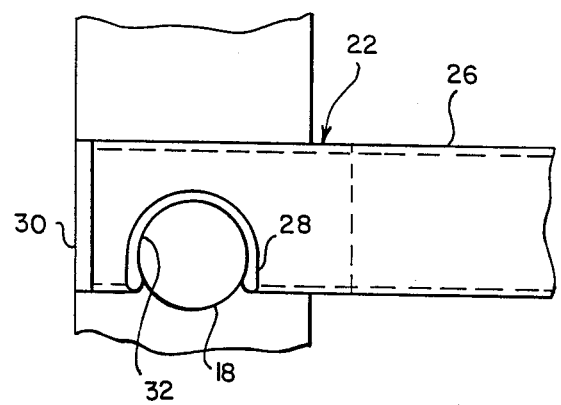
FIG. 2 illustrates a joint between a fixed rail and a movable rail.

Turning now to FIG. 2, the movable rail 22 illustrated is constituted by a hollow tube 26 of a suitable material e.g. aluminium or stainless steel. A transverse opening 28 which is substantially semi-circular when viewed in elevation is cut through the wall of the tube 26 adjacent each end thereof. A plug 30 of a material such as rubber, 'Nylon' or 'Teflon' is pushed into the open end of the tube 26. The plug 30 has two functions. Firstly, it forms a decorative end closure for the tube 26 and secondly it forms the means which bears on the fixed rail 18 when the movable rail 22 is attached to the fixed rail. More specifically, the plug 30 has a part cylindrical transverse groove 32 in the cylindrical outer face thereof, the groove 32 and the transverse opening 28 in the cylindrical wall of the tube 26 registering. When the movable rail is secured to one of the fixed rails, the fixed rail enters the registering transverse opening and groove. The diameter of the fixed rail is such that the walls of the groove 32 are slightly deformed as the fixed rail enters it. There is thus a gripping action between the surfaces of the groove and the fixed rail. This prevents the two rails slipping with respect to one another when the stand is being loaded with merchandise, or merchandise on the stand is being examined by a customer and perhaps being slid along the rail.

Figure 3:
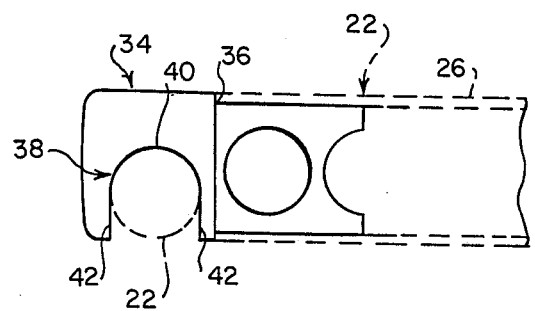
FIG. 3 illustrates a further form of joint.

The joint of FIG. 3 differs from that of FIG. 2 in that the cylindrical plug 34 has an outer surface with a change in diameter in it thereby providing two portions of different diameters. An annular abutment surface 36 is formed where the two portions meet. The tube 26 forming the rail 22 abuts the surface 36 as the plug 34 is pushed into the tube 26.

A transverse groove 38 is formed in the larger diameter part of the plug 34 and is thus outside the tube 26 when the plug is inserted into the tube 26 up to the surface 36. The groove 38 is bounded by a part-cylindrical surface 40 which is somewhat over semi-cylindrical in extent. Two slightly converging flat surfaces 42 extend downwardly from the lower edges of the surface 40. The diameter of the rail 18 is slightly greater than the diameter of the surface 40 and hence greater than the spacing between the surfaces 42. Thus the surfaces 42 are forced apart as the rail 18 is inserted into the groove 38 from below. The rail 18 is gripped by the plug 34 and hence the rail 22 cannot readily be lifted off the rail 18 or slid along it.

The surfaces 42 can be parallel with one another if desired or could even diverge slightly to facilitate entrance of the rail.

I claim:

1. In a display stand a joint structure which enables one rail of the display stand to be adjustably mounted atop a further rail of the display stand which is transverse thereto, said one rail being tubular with a plug pushed into its end, the plug being of a resilient material and having a part cylindrical downwardly open transverse groove in the underside of the cylindrical outer face thereof, said further rail entering said groove from below when said one rail is pressed down onto said further rail, said plug resiliently gripping said further rail to inhibit relative sliding movement of said one rail with respect to said further rail.

2. A joint structure according to claim 1, in which said groove is bounded by a part-cylindrical surface which is more than semi-cylindrical in extent and two flat surfaces which form extensions of the part-cylindrical surface, free edges of said flat surfaces bounding the entrance to said groove.

3. A joint structure according to claim 2, in which said flat surfaces converge with one another so that said groove is narrower at said entrance than where said part-cylindrical surface and said flat surfaces intersect.

4. A joint structure according to claim 2, in which said plug has a cylindrical outer surface consisting of two portions of different diameters, there being an annular abutment surface where said two portions meet, said end of said one rail abutting said abutment surface, the larger diameter portion of the plug having said groove in it and being outside said one rail.

5. A joint structure according to claim 1, in which said one rail has a transverse opening in the wall thereof, said groove and said opening being aligned so that said further rail is entered in both when said one rail is mounted on the further rail.

* * * * *